H. W. RICH & C. E. GATES.
THRESHING CYLINDER.
APPLICATION FILED NOV. 8, 1911.
1,020,714.
Patented Mar. 19, 1912.
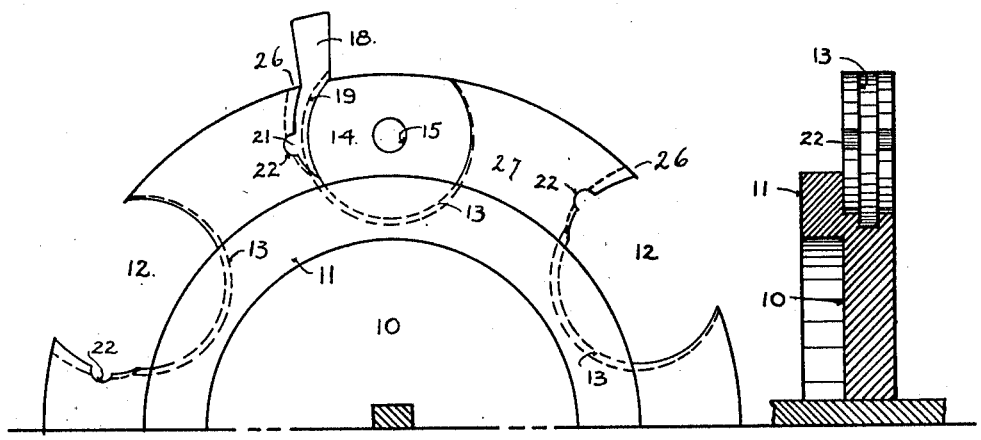
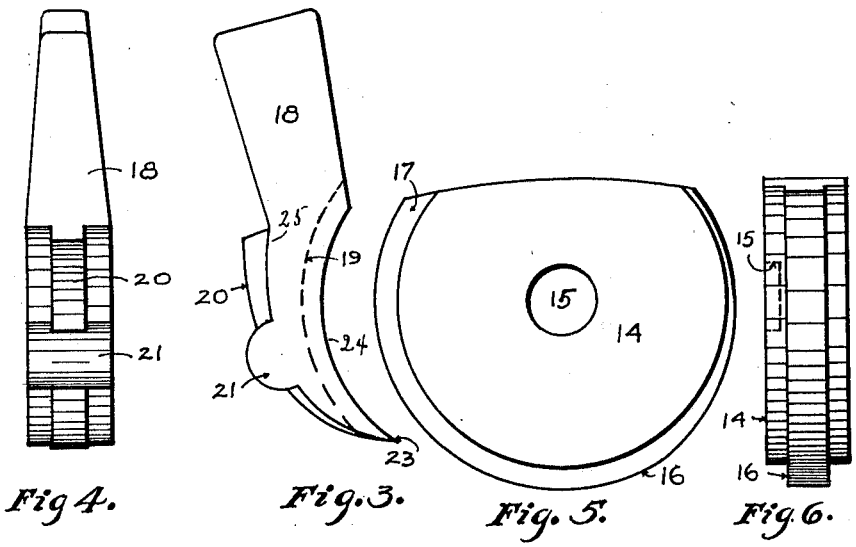

UNITED STATES PATENT OFFICE.

HARRISON W. RICH AND CHARLES E. GATES, OF SPOKANE, WASHINGTON, ASSIGNORS TO OLYMPIC INSERTED TOOTH CYLINDER COMPANY, OF SPOKANE, WASHINGTON, A CORPORATION.

THRESHING-CYLINDER.

1,020,714.     Specification of Letters Patent.     Patented Mar. 19, 1912.

Application filed November 8, 1911. Serial No. 659,266.

*To all whom it may concern:*

Be it known that we, HARRISON W. RICH and CHARLES E. GATES, citizens of the United States of America, residing at Spokane, in the county of Spokane and State of Washington, have invented certain new and useful Improvements in Threshing-Cylinders, of which the following is a specification.

This invention pertains to toothed cylinders of the kind adapted to rotate upon a shaft and thresh wheat, oats and the like from straw.

The particular object of this invention is to provide a construction whereby the teeth in the cylinder may be readily removed and replaced and at the same time be securely locked in their positions so they will not rattle nor jar loose.

Other objects and purposes will be hereinafter disclosed and illustrated in the drawings, in which—

Figure 1, is a side view of one-half of a disk entering into the construction of the cylinder, and in which the teeth are secured, showing the manner of locking the teeth in the disk: Fig. 2, is a vertical sectional view taken through the center of Fig. 1; Fig. 3, is a detail side view of one of the teeth entering into the construction of the cylinder: Fig. 4, is an edge view of Fig. 3: Fig. 5, is a side view of one of the keys used to lock the teeth in place in the disks of the cylinder, and Fig. 6 is an edge view of Fig. 5.

In illustrating this invention we are using the form of cylinders made up of a multiple number of circular disks arranged horizontally on a shaft and provided with outwardly extending rims in which the teeth are secured. We do not wish, however, to limit the use of the teeth and the manner of locking the same place in the cylinders to this particular class of cylinders.

The disks 10 are provided with outwardly projecting rims 27 in which are crescent shaped openings 12, grooves 13 being provided around the edges thereof. The teeth 18 are provided with grooves 19 following a concave surface 24 and tongues 20 following a convex surface 25, an outwardly projecting lug 21 extending from the surface 25 interrupting the tongue 20 and extends beyond the same. The teeth 18 are adapted to set into the rims 27 in the manner shown in Fig. 1 with the tongue 20 resting in the groove 26, the lug 21 in the concave opening 22. Keys 14 having tongues 17 are adapted to set into the openings 12 with the tongues 17 engaging the grooves 13 in the rims 27 and the grooves 19 in the concave surface 24 of the teeth 18.

In setting the teeth in position as shown in Fig. 1, the teeth 18 are first placed in position, then the keys 14 inserted in the openings 12. The keys 14 lock the teeth 18 firmly and securely in position while removing the keys 14 will permit the easy taking out of the teeth 18 and the replacing of the same. By this construction we avoid the use of bars or other construction liable to jar loose. Openings 15 are provided in the keys 14 in which a wrench may be inserted for the placing or removing of the keys. The teeth 18 terminate at their lower ends in a point 23, in order to make a snug and uniform fitting of the parts coöperating therewith.

Having thus described our invention, what we claim as new and useful and desire to secure by Letters-Patent, is,

1. A threshing cylinder comprising teeth having a tongue on a convex surface and groove on a concave surface, a lug reaching from the convex surface interrupting the tongue and extending beyond the same, coöperating with circular disks entering into the construction of the cylinder and having concave openings provided with grooves and surfaces adapted to fit the tongue and lugs of the teeth, together with keys adapted also to fit into said concave openings and rest against the teeth on one side and engage the surface of the openings the remainder of the way around.

2. A threshing cylinder comprising circular disks having outwardly extending rims provided with concave surfaces having grooves and openings in which are snugly inserted teeth having tongues and outwardly extending lugs interrupting the tongues, and keys provided with tongues engaging the teeth on one side and the remainder of the concave surface in the rims of the disks.

In testimony whereof we affix our signatures in presence of two witnesses.

HARRISON W. RICH.
CHARLES E. GATES.

Witnesses:
E. FRANCES WORLEY,
MONICA B. THOMPSON.

Copies of this patent may be obtained for five cents each, by addressing the "Commissioner of Patents, Washington, D. C."